(12) United States Patent
Wu et al.

(10) Patent No.: US 12,094,255 B2
(45) Date of Patent: *Sep. 17, 2024

(54) METHOD, SYSTEM AND RELATED DEVICE OF IMPLEMENTING VEHICLE AUTOMATIC INSPECTION AND REPAIR

(71) Applicant: Beijing Tusen Zhitu Technology Co., Ltd., Beijing (CN)

(72) Inventors: Nan Wu, Beijing (CN); He Zheng, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,334

(22) Filed: Jul. 31, 2023

(65) Prior Publication Data

US 2023/0377379 A1 Nov. 23, 2023

Related U.S. Application Data

(63) Continuation of application No. 17/548,448, filed on Dec. 10, 2021, now Pat. No. 11,715,336, which is a
(Continued)

(30) Foreign Application Priority Data

Jul. 21, 2017 (CN) .......................... 201710602331.6

(51) Int. Cl.
*G07C 5/00* (2006.01)
*G05D 1/00* (2024.01)
(Continued)

(52) U.S. Cl.
CPC ............ *G07C 5/006* (2013.01); *G05D 1/0088* (2013.01); *G05D 1/0225* (2013.01); *G07C 5/008* (2013.01);
(Continued)

(58) Field of Classification Search
CPC ...... G07C 5/006; G07C 5/008; G07C 5/0808; G07C 2205/02; G05D 1/0088;
(Continued)

(56) References Cited

U.S. PATENT DOCUMENTS

| | | |
|---|---|---|
| 6,777,904 B1 | 8/2004 | Degner |
| 7,103,460 B1 | 9/2006 | Breed |

(Continued)

FOREIGN PATENT DOCUMENTS

| | | |
|---|---|---|
| CN | 101251923 A | 8/2008 |
| CN | 101482752 A | 7/2009 |

(Continued)

OTHER PUBLICATIONS

No Author. Chinese Application No. 201710602331.6, First Search Report Mailed Jun. 30, 2018, pp. 1-2.

(Continued)

*Primary Examiner* — Alan D Hutchinson
(74) *Attorney, Agent, or Firm* — Perkins Coie LLP

(57) ABSTRACT

The present application discloses a method, system and related device of implementing vehicle automatic inspection and repair. The method includes: obtaining, by a vehicle controller, vehicle self-inspection data, and controlling a vehicle to drive and stop at an inspection and repair position when determining the vehicle malfunctions according to the vehicle self-inspection data; sending, by the vehicle controller, vehicle diagnostic information to an inspection and repair apparatus; and determining, by the inspection and repair apparatus, a corresponding repair advice according to the vehicle diagnostic information, and sending the repair advice to the vehicle controller.

20 Claims, 2 Drawing Sheets

Related U.S. Application Data continuation of application No. 16/035,666, filed on Jul. 15, 2018, now Pat. No. 11,200,758.

(51) Int. Cl.
*G07C 5/08* (2006.01)
*G08G 1/0968* (2006.01)
*H04W 4/40* (2018.01)

(52) U.S. Cl.
CPC ......... *G07C 5/0808* (2013.01); *G08G 1/0968* (2013.01); *H04W 4/40* (2018.02); *G07C 2205/02* (2013.01)

(58) Field of Classification Search
CPC ..... G05D 1/0225; G08G 1/0968; H04W 4/40; G05B 23/0213; G05B 2219/24065
See application file for complete search history.

(56) References Cited

U.S. PATENT DOCUMENTS

| | | |
|---|---|---|
| 7,783,403 B2 | 8/2010 | Breed |
| 8,412,449 B2 | 4/2013 | Trepagnier |
| 8,788,134 B1 | 7/2014 | Litkouhi |
| 8,965,621 B1 | 2/2015 | Urmson |
| 8,970,359 B2 | 3/2015 | Barth |
| 9,002,632 B1 | 4/2015 | Emigh |
| 9,111,444 B2 | 8/2015 | Kaganovich |
| 9,134,402 B2 | 9/2015 | Sebastian |
| 9,248,835 B2 | 2/2016 | Tanzmeister |
| 9,315,192 B1 | 4/2016 | Zhu |
| 9,317,033 B2 | 4/2016 | Ibanez-guzman |
| 9,342,074 B2 | 5/2016 | Dolgov |
| 9,399,397 B2 | 7/2016 | Mizutani |
| 9,438,878 B2 | 9/2016 | Niebla |
| 9,476,970 B1 | 10/2016 | Fairfield |
| 9,535,423 B1 | 1/2017 | Debreczeni |
| 9,582,944 B2 | 2/2017 | Brozovich |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 10,086,782 B1 | 10/2018 | Konrardy |
| 11,200,758 B2 | 12/2021 | Wu et al. |
| 2006/0229777 A1 | 10/2006 | Hudson |
| 2008/0249667 A1 | 10/2008 | Horvitz |
| 2009/0040054 A1 | 2/2009 | Wang |
| 2010/0049397 A1 | 2/2010 | Lin |
| 2012/0083959 A1 | 4/2012 | Dolgov |
| 2015/0142257 A1 | 5/2015 | Brozovich |
| 2016/0163130 A1 | 6/2016 | Zagajac |
| 2016/0321381 A1 | 11/2016 | English |
| 2016/0375907 A1 | 12/2016 | Erban |
| 2019/0026960 A1 | 1/2019 | Wu et al. |
| 2022/0101658 A1 | 3/2022 | Wu et al. |

FOREIGN PATENT DOCUMENTS

| | | |
|---|---|---|
| CN | 101718992 A | 6/2010 |
| CN | 102073319 A | 5/2011 |
| CN | 102120441 A | 7/2011 |
| CN | 102347980 A | 2/2012 |
| CN | 102455700 A | 5/2012 |
| CN | 103135515 A | 6/2013 |
| CN | 103676923 A | 3/2014 |
| CN | 104331066 A | 2/2015 |
| CN | 204821320 U | 12/2015 |
| CN | 105480259 A | 4/2016 |
| CN | 106094830 A | 11/2016 |
| CN | 106143202 A | 11/2016 |
| CN | 106354130 A | 1/2017 |
| CN | 106406269 A | 2/2017 |
| WO | 03034166 A1 | 4/2003 |

OTHER PUBLICATIONS

No Author. Chinese Application No. 201710602331.6, First Office Action, Mailed Jul. 10, 2018, pp. 1-14.
No Author. Chinese Application No. 201710602331.6, Supplementary Search Report Mailed, Jan. 22, 0219, p. 1.
No Author. Chinese Application No. 201710602331.6, Second Supplementary Search Report Mailed, Feb. 26, 2019, pp. 1-2.
No Author. Chinese Application No. 201710602331.6 Second Office Action Mailed Jun. 3, 2019, pp. 1-15.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, dale unknown.
Kyoungho Ahn, Hesham Rakha, "The Effects of Route Choice Decisions on Vehicle Energy Consumption and Emissions", Virginia Tech Transportation Institute, Blacksburg, VA 24061, dale unknown.
Ramos, Sebastian, Gehrig, Stefan, Pinggera, Peter, Franke, Uwe, Rother, Carsten, "Detecting Unexpected Obstacles or Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognitionand Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Breslow, Gabriel J., "Hierarchical Subquery Evaluation for Active earning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", rXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Deter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Sames", Intel

(56) References Cited

OTHER PUBLICATIONS

Labs, European Conference on Computer Vision {ECCV}, Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordis, Mohamed Omran, Sebastian Ramos, Timo Rehfeld, Markus Enzweiler Rodrigo Benenson, Uwe Franke, Stefan Roth, and Berni Schiele, "The Cityscapes Dataset for Semantic Urban Scene Understanding", Proceedings of the IEEE Computer Society Conference on Computer Vision and Pattern Recognition {CVPR), Las Vegas, Nevada, 2016.

Adhiraj Somani, Nan Ye, David Hsu, and Wee Sun Lee, "DESPOT: Online POMDP Planning with Regularization", Department of Computer Science, National University of Singapore, dale unknown.

Adam Paszke, Abhishek Chaurasia, Sangpil Kim, and Eugenio Culurciello. Enet: A deep neural network Architecture for real-lime semantic segmentation. CoRR, abs/1606.02147, 2016.

METHOD, SYSTEM AND RELATED DEVICE OF IMPLEMENTING VEHICLE AUTOMATIC INSPECTION AND REPAIR

CROSS-REFERENCE TO RELATED APPLICATIONS

This patent document is a continuation of U.S. patent application Ser. No. 17/548,448, filed on Dec. 10, 2021 and issued as U.S. Pat. No. 11,715,336, which is a continuation of U.S. patent application Ser. No. 16/035,666, filed on Jul. 15, 2018 and issued as U.S. Pat. No. 11,200,758, which claims priority to and the benefit of Chinese Patent Application No. 201710602331.6, filed on Jul. 21, 2017. The aforementioned applications are incorporated herein by reference in their entireties.

FIELD

The present application relates to the autonomous driving field, and particularly to a method of implementing vehicle automatic inspection and repair, a system of implementing vehicle automatic inspection and repair, a vehicle controller, and an inspection and repair apparatus.

BACKGROUND

With the development of the autonomous driving technology, the autonomous vehicles will be more and more popular. The safety in the driving process of the autonomous vehicles appears to be particularly important. However, how to implement the automatic inspection and repair of the vehicles becomes an urgent problem to be solved by those skilled in the art. At present, there is no related disclosed technology of implementing the automatic inspection and repair of the autonomous vehicles.

BRIEF SUMMARY

The present application provides a method and system of implementing vehicle automatic inspection and repair, a vehicle controller, and an inspection and repair apparatus.

An embodiment of the present application provides a method of implementing vehicle automatic inspection and repair, which includes:
  obtaining, by a vehicle controller, vehicle self-inspection data, and controlling a vehicle to drive and stop at an inspection and repair position when determining the vehicle malfunctions according to the vehicle self-inspection data;
  sending, by the vehicle controller, vehicle diagnostic information to an inspection and repair apparatus; and
  determining, by the inspection and repair apparatus, a corresponding repair advice according to the vehicle diagnostic information, and sending the repair advice to the vehicle controller.

An embodiment of the present application provides a system of implementing vehicle automatic inspection and repair, which includes:
  a vehicle controller configured to obtain vehicle self-inspection data, control a vehicle to drive and stop at an inspection and repair position when determining the vehicle malfunctions according to the vehicle self-inspection data, and send vehicle diagnostic information to an inspection and repair apparatus; and
  the inspection and repair apparatus configured to determine a corresponding repair advice according to the vehicle diagnostic information, and send the repair advice to the vehicle controller.

An embodiment of the present application provides a vehicle controller, which includes:
  a communication unit configured to receive and send information; and
  a control unit configured to obtain vehicle self-inspection data, control a vehicle to drive and stop at an inspection and repair position when determining the vehicle malfunctions according to the vehicle self-inspection data, and send, by the communication unit, vehicle diagnostic information to an inspection and repair apparatus.

An embodiment of the present application further provides an inspection and repair apparatus, which includes:
  a communication unit configured to receive and send information; and
  an inspection and repair unit configured to receive, by the communication unit, vehicle diagnostic information from a vehicle controller of a vehicle, determine a corresponding repair advice according to the vehicle diagnostic information, and send the repair advice to the vehicle controller.

BRIEF DESCRIPTION OF THE DRAWINGS

The accompanying drawings are used to provide the further understanding of the present application and constitute a part of the specification, and serve to explain the present application together with the embodiments of the present application but not limit the present application.

DETAILED DESCRIPTION OF THE EMBODIMENTS

In order to make those skilled in the art better understand the technical solution in the present application, the technical solution in the embodiments of the present application will be described clearly and completely below in combination with the accompanying drawings in the embodiments of the present application. Obviously the described embodiments are just a part of the embodiments of the present application but not all the embodiments. Based upon the embodiments of the present application, all of other embodiments obtained by those ordinary skilled in the art without creative work should pertain to the protection scope of the present application.

For the problem that the automatic inspection and repair of the unmanned vehicle can not be implemented in the prior art, the embodiments of the present application provide a method and system of implementing vehicle automatic inspection and repair, in which an inspection and repair apparatus is arranged at a preset inspection and repair position, and the vehicle controller can control the vehicle to drive to the inspection and repair position when determining the vehicle malfunctions according to the vehicle self-inspection data, and interact with the inspection and repair apparatus at this inspection and repair position to accomplish the automatic inspection and repair without manual intervention, thereby implementing the function of the automatic inspection and repair of the autonomous vehicle.

In an embodiment of the present application, the vehicle controller of the vehicle can be a DSP (Digital Signal Processor), FPGA (Field-Programmable Gate Array) controller, industrial computer, driving computer, ECU (Electronic Control Unit), or VCU (Vehicle Control Unit) or the like, which is not limited strictly by the present application.

First Embodiment

Figure 1:
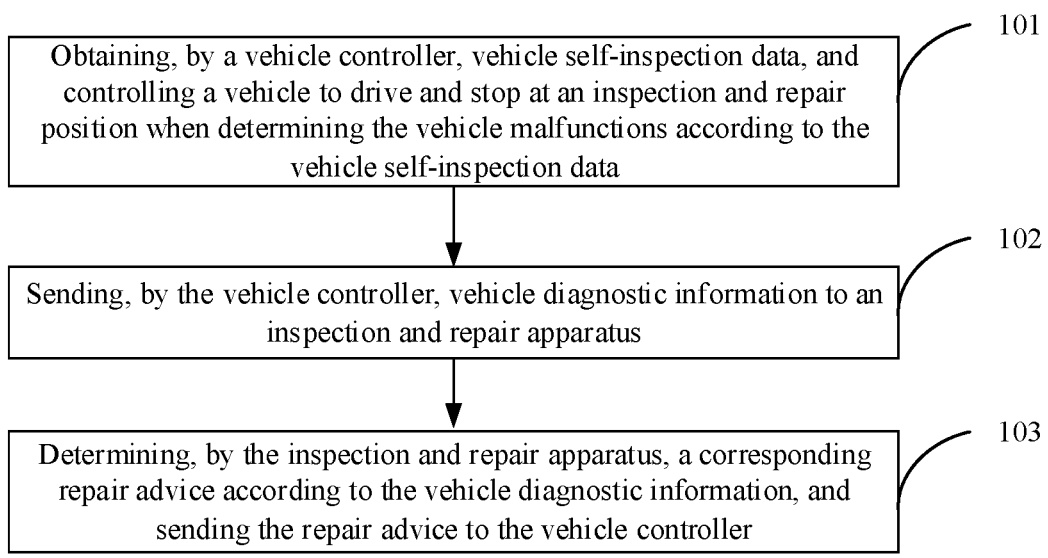
FIG. 1 is a flow chart of a method of implementing vehicle automatic inspection and repair in an embodiment of the present application.

Referring to FIG. 1 which is a flow chart of a method of implementing vehicle automatic inspection and repair in an embodiment of the application, the method includes:

Step 101: obtaining, by a vehicle controller, vehicle self-inspection data, and controlling a vehicle to drive and stop at an inspection and repair position when determining the vehicle malfunctions according to the vehicle self-inspection data.

In an embodiment of the application, the vehicle controller obtains the vehicle self-inspection data, which can be achieved by but not limited to any of the following modes:

Mode A1: the vehicle controller obtains the monitoring data from the vehicle self-inspection system.

In the mode A1, the vehicle controller sends a request of obtaining the monitoring data to the vehicle self-inspection system periodically and actively, to obtain the monitoring data from the vehicle self-inspection system.

Mode A2: the vehicle controller receives the monitoring data from the vehicle self-inspection system.

In the mode A2, the vehicle self-inspection system sends the monitoring data to the vehicle controller periodically and actively.

In an embodiment of the application, the monitoring data contains the self-inspection data of each component in the vehicle, e.g., tire pressure abnormity alarm information, Transmission Control Unit (Automatic Transmission Control Unit, TCU) abnormity alarm information, voltage abnormity alarm information and the like.

In an embodiment of the present application, if the monitoring data contains the alarm information of the component, it is confirmed that the corresponding component malfunctions.

Step 102: sending, by the vehicle controller, vehicle diagnostic information to an inspection and repair apparatus.

In an embodiment of the application, the vehicle controller obtains the vehicle diagnostic information from an On-Board Diagnostic (OBD) system through a Controller Area Network (CAN) bus, and sends the vehicle diagnostic information to the inspection and repair apparatus.

Step 103: determining, by the inspection and repair apparatus, a corresponding repair advice according to the vehicle diagnostic information, and sending the repair advice to the vehicle controller.

In an embodiment of the application, in the above step 103, the inspection and repair apparatus determines the corresponding repair advice according to the vehicle diagnostic information, which can be achieved by but not limited to any of the following modes:

Mode B1: the inspection and repair apparatus obtains the corresponding repair advice from a prestored corresponding relationship between vehicle diagnostic information and repair advices according to the vehicle diagnostic information.

Mode B2: the inspection and repair apparatus sends the vehicle diagnostic information to a server remotely, and receives the repair advice corresponding to the vehicle diagnostic information from the server.

Mode B3: the inspection and repair apparatus displays an advice request including the vehicle diagnostic information on a repair interface; and generates the repair advice corresponding to the vehicle diagnostic information, according to content replied by a maintenance person for the advice request on the repair interface.

In an embodiment of the present application, in the above step 101, the vehicle controller controls the vehicle to drive and stop at the inspection and repair position, which includes: the vehicle controller plans a route from a current position to the selected inspection and repair position through a map software or navigation software installed in the vehicle controller, and the vehicle controller controls the vehicle to drive along the route and stop at the inspection and repair position.

In an embodiment of the present application, the selected inspection and repair position can be the inspection and repair position closest to the current position of the vehicle.

In an embodiment of the present application, the repair advice can includes but not limited to one or more of: no repair is needed, repair the vehicle in the target highway port, calling the rescue, minor repair in a repair shop/4S shop is needed, overhaul in a repair shop/4S shop is needed and the like. When the repair advice is a minor repair/overhaul in a repair shop/4S shop is needed, the vehicle controller queries the repair shop or 4S shop closest to the target highway port through the electronic map, controls the vehicle to drive from the inspection and repair position to the exit position of the target highway port, and controls the vehicle to drive from the exit position of the target highway port to the closest repair shop or 4S shop.

Second Embodiment

Figure 2:
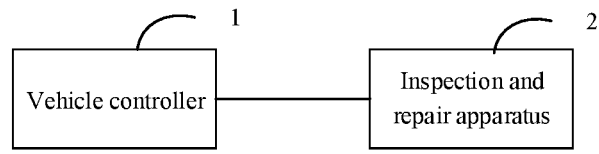
FIG. 2 is a structural schematic diagram of a system of implementing vehicle automatic inspection and repair in an embodiment of the present application.

Based upon the same concept as the method of implementing vehicle automatic inspection and repair provided by the first embodiment described above, the second embodiment of the application provides a system of implementing vehicle automatic inspection and repair. The structure of the system is as shown in FIG. 2, which includes:

a vehicle controller 1 configured to obtain vehicle self-inspection data, control a vehicle to drive and stop at an inspection and repair position when determining the vehicle malfunctions according to the vehicle self-inspection data, and send vehicle diagnostic information to an inspection and repair apparatus 2; and the inspection and repair apparatus 2 configured to determine a corresponding repair advice according to the vehicle diagnostic information, and send the repair advice to the vehicle controller 1.

In some embodiments, the inspection and repair apparatus 2 determines the corresponding repair advice according to the vehicle diagnostic information, which includes:

the inspection and repair apparatus 2 obtains the corresponding repair advice from a prestored corresponding relationship between vehicle diagnostic information and repair advices according to the vehicle diagnostic information;

or, the inspection and repair apparatus 2 sends the vehicle diagnostic information to a server remotely, and receives the repair advice corresponding to the vehicle diagnostic information from the server;

or, the inspection and repair apparatus 2 displays an advice request including the vehicle diagnostic information on a repair interface, and generates the repair advice corresponding to the vehicle diagnostic information according to content replied by a maintenance person for the advice request on the repair interface.

In some embodiments, the vehicle controller sends the vehicle diagnostic information to the inspection and repair apparatus, which includes:

the vehicle controller obtains the vehicle diagnostic information from an on-board diagnostic system through a Controller Area Network bus, and sends the vehicle diagnostic information to the inspection and repair apparatus.

In some embodiments, the vehicle controller obtains the vehicle self-inspection data, which includes: the vehicle controller obtains or receives monitoring data from a vehicle self-inspection system.

In some embodiments, the vehicle controller controls the vehicle to drive and stop at the inspection and repair position, which includes: the vehicle controller plans a route from a current position to the selected inspection and repair position through a map software or navigation software installed in the vehicle controller, and controls the vehicle to drive along the route and stop at the inspection and repair position.

Third Embodiment

Figure 3:
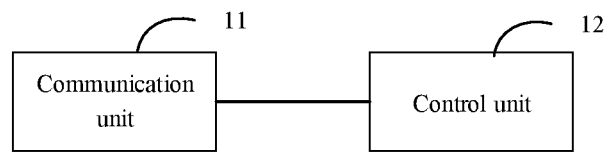
FIG. 3 is a structural schematic diagram of a vehicle controller in an embodiment of the present application.

The embodiment of the present application provides a vehicle controller. The structure of the vehicle controller is as shown in FIG. 3, which includes:

a communication unit 11 configured to receive and send information; and a control unit 12 configured to obtain vehicle self-inspection data, control a vehicle to drive and stop at an inspection and repair position when determining the vehicle malfunctions according to the vehicle self-inspection data, and send, by the communication unit 11, vehicle diagnostic information to an inspection and repair apparatus.

In some embodiments, the control unit 12 sends, by the communication unit 11, the vehicle diagnostic information to the inspection and repair apparatus, which includes:

the control unit 12 obtains the vehicle diagnostic information from an OBD system through a CAN bus, and sends, by the communication unit 11, the vehicle diagnostic information to the inspection and repair apparatus.

In some embodiments, the control unit 12 obtains the vehicle self-inspection data, which includes: the control unit 12 obtains or receives monitoring data from a vehicle self-inspection system.

In some embodiments, the control unit 12 controls the vehicle to drive and stop at the inspection and repair position, which includes: the control unit 12 plans a route from a current position to the selected inspection and repair position through a map software or navigation software installed in the vehicle controller, and controls the vehicle to drive along the route and stop at the inspection and repair position.

Fourth Embodiment

Figure 4:
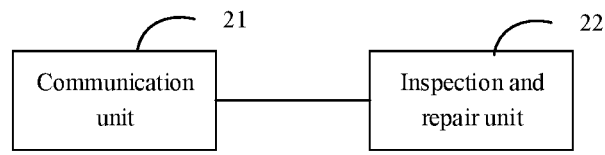
FIG. 4 is a structural schematic diagram of an inspection and repair apparatus in an embodiment of the present application.

The fourth embodiment of the application provides an inspection and repair apparatus. The structure of the inspection and repair apparatus is as shown in FIG. 4, which includes:

a communication unit 21 configured to receive and send information; and an inspection and repair unit 22 configured to receive, by the communication unit 11, vehicle diagnostic information from a vehicle controller of a vehicle, determine a corresponding repair advice according to the vehicle diagnostic information, and send the repair advice to the vehicle controller.

In some embodiments, the inspection and repair unit 22 determines the corresponding repair advice according to the vehicle diagnostic information, which includes:

the inspection and repair unit 22 obtains the corresponding repair advice from a prestored corresponding relationship between vehicle diagnostic information and repair advices according to the vehicle diagnostic information;

or, the inspection and repair unit 22 sends the vehicle diagnostic information to a server remotely, and receives the repair advice corresponding to the vehicle diagnostic information from the server;

or, the inspection and repair unit 22 displays an advice request containing the vehicle diagnostic information on a repair interface, and generates the repair advice corresponding to the vehicle diagnostic information according to content replied by a maintenance person for the advice request on the repair interface.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method of vehicle repair implemented by a vehicle controller of a vehicle, comprising:
   receiving, from a vehicle self-inspection system of the vehicle, monitoring data periodically, wherein the monitoring data includes vehicle self-inspection data;
   controlling the vehicle to drive and stop at an inspection and repair position in response to determining the vehicle malfunctions according to the vehicle self-inspection data;
   obtaining, from an on-board diagnostic system of the vehicle, vehicle diagnostic information in response to determining that the vehicle is at the inspection and repair position;
   sending the vehicle diagnostic information to an inspection and repair apparatus arranged at the inspection and repair position so that the inspection and repair apparatus determines a corresponding repair advice according to the vehicle diagnostic information; and
   receiving, from the inspection and repair apparatus, the repair advice.

2. The method of claim 1, wherein the repair advice corresponding to the vehicle diagnostic information is from pre-stored relationships between multiple vehicle diagnostic information and corresponding multiple repair advice.

3. The method of claim 1, wherein the inspection and repair position is closest to a current position of the vehicle.

4. The method of claim 1, wherein a type of repair indicated in the repair advice causes the vehicle to be driven to another location.

5. The method of claim 4, wherein the type of repair indicated in the repair advice includes a minor repair or an overhaul needed in a repair shop.

6. The method of claim 1, wherein the obtaining, from the on-board diagnostic system, the vehicle diagnostic information is performed using a controller area network (CAN) bus.

7. A vehicle controller, comprising:
   a processor configured to:
      receive, from a vehicle self-inspection system of a vehicle, monitoring data periodically, wherein the monitoring data includes vehicle self-inspection data;
      control the vehicle to drive and stop at an inspection and repair position in response to determining the vehicle malfunctions according to the vehicle self-inspection data;
      obtain, from an on-board diagnostic system of the vehicle, vehicle diagnostic information in response to determining that the vehicle is at the inspection and repair position;
      send the vehicle diagnostic information to an inspection and repair apparatus arranged at the inspection and repair position so that the inspection and repair apparatus determines a corresponding repair advice according to the vehicle diagnostic information; and
      receive, from the inspection and repair apparatus, the repair advice.

8. The vehicle controller of claim 7, wherein the repair advice indicates that no repair is needed.

9. The vehicle controller of claim 7, wherein the repair advice indicates to repair the vehicle in a target highway port.

10. The vehicle controller of claim 7, wherein the repair advice indicates that a minor repair is needed in a repair shop.

11. The vehicle controller of claim 7, wherein the repair advice indicates that an overhaul is needed in a repair shop.

12. The vehicle controller of claim 7, wherein the processor is configured to obtain, from the on-board diagnostic system, the vehicle diagnostic information using a controller area network (CAN) bus.

13. The vehicle controller of claim 7, wherein the processor is further configured to:
   query, through an electronic map, a repair shop in response to receiving the repair advice indicating that a repair is needed; and
   controlling the vehicle to drive to the repair shop.

14. A non-transitory computer-readable storage medium comprising computer-executable instructions which, when executed by a computer, causes the computer to perform a method comprising:
   receiving, from a vehicle self-inspection system of a vehicle, monitoring data periodically, wherein the monitoring data includes vehicle self-inspection data;
   controlling the vehicle to drive and stop at an inspection and repair position in response to determining the vehicle malfunctions according to the vehicle self-inspection data;
   obtaining, from an on-board diagnostic system of the vehicle, vehicle diagnostic information in response to determining that the vehicle is at the inspection and repair position;
   sending the vehicle diagnostic information to an inspection and repair apparatus arranged at the inspection and repair position so that the inspection and repair apparatus determines a corresponding repair advice according to the vehicle diagnostic information; and
   receiving, from the inspection and repair apparatus, the repair advice.

15. The non-transitory computer-readable storage medium of claim 14, wherein the repair advice corresponding to the vehicle diagnostic information is from pre-stored relationships between multiple vehicle diagnostic information and corresponding multiple repair advice.

16. The non-transitory computer-readable storage medium of claim 14, wherein the inspection and repair position is closest to a current position of the vehicle.

17. The non-transitory computer-readable storage medium of claim 14, wherein a type of repair indicated in the repair advice causes the vehicle to be driven to another location.

18. The non-transitory computer-readable storage medium of claim 17, wherein the type of repair indicated in the repair advice includes a minor repair or an overhaul needed in a repair shop.

19. The non-transitory computer-readable storage medium of claim 14, wherein the obtaining, from the on-board diagnostic system, the vehicle diagnostic information is performed using a controller area network (CAN) bus.

20. The non-transitory computer-readable storage medium of claim 14, wherein the instructions, when executed by the computer, causes the computer to perform a method further comprising:
   querying, through an electronic map, a repair shop in response to receiving the repair advice indicating that a repair is needed; and
   controlling the vehicle to drive to the repair shop.

\* \* \* \* \*